US012732116B2

(12) United States Patent
Li

(10) Patent No.: US 12,732,116 B2
(45) Date of Patent: Sep. 8, 2026

(54) CHARGER

(71) Applicant: VIVO MOBILE COMMUNICATION CO., LTD., Dongguan (CN)

(72) Inventor: Dahuan Li, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 584 days.

(21) Appl. No.: 18/217,477

(22) Filed: Jun. 30, 2023

(65) Prior Publication Data

US 2023/0353057 A1 Nov. 2, 2023

Related U.S. Application Data

(63) Continuation of application No. PCT/CN2021/141519, filed on Dec. 27, 2021.

(30) Foreign Application Priority Data

Dec. 31, 2020 (CN) ......................... 202011633614.5

(51) Int. Cl.
*H02M 3/335* (2006.01)
*H02J 7/90* (2026.01)

(52) U.S. Cl.
CPC ......... *H02M 3/33592* (2013.01); *H02J 7/933* (2026.01); *H02J 2207/20* (2020.01)

(58) Field of Classification Search
CPC ... H02M 3/33592; H02J 7/933; H02J 2207/20
See application file for complete search history.

(56) References Cited

U.S. PATENT DOCUMENTS 9,958,509 B2 * 5/2018 Choi ......................... H02J 7/84
10,566,907 B1 * 2/2020 Hayasaki ............... G03G 15/80
(Continued)

FOREIGN PATENT DOCUMENTS

CN 103887976 A 6/2014
CN 106469983 A 3/2017
(Continued)

OTHER PUBLICATIONS

International Search Report issued in corresponding International Application No. PCT/CN2021/141519, mailed Mar. 18, 2022, 6 pages.
(Continued)

*Primary Examiner* — Adolf D Berhane
(74) *Attorney, Agent, or Firm* — IPX PLLC

(57) ABSTRACT

A charger is provided. The charger includes: a power input end, a power output end, a switching module, and a transformer. A primary side of the transformer is provided with a power input module. The power input module is connected to the power input end through the switching module. A secondary-side winding of the transformer is connected to the power output end. The switching module can be switched among a first conducting state, a second conducting state, and a third conducting state. When an output voltage corresponding to the power output end is in the range of a first voltage V1 to a second voltage V2, the switching module is switched between the first conducting state and the second conducting state, and the power input module operates in a resonance mode.

11 Claims, 4 Drawing Sheets

(56) References Cited

U.S. PATENT DOCUMENTS

2015/0349627 A1 12/2015 Lin et al.
2023/0344264 A1* 10/2023 Li ............................ H02J 7/06

FOREIGN PATENT DOCUMENTS

CN 107947587 A 4/2018
CN 111130353 A 5/2020
CN 111251916 A 6/2020
CN 112821482 A 5/2021
CN 112821483 A 5/2021

OTHER PUBLICATIONS

First Office Action issued in related Chinese Application No. 202011633614.5, mailed Jan. 19, 2023, 6 pages.

* cited by examiner

CHARGER

CROSS-REFERENCE TO RELATED APPLICATIONS

This application is a continuation of International Application No. PCT/CN2021/141519, filed on Dec. 27, 2021, which claims priority to Chinese Patent Application No. 202011633614.5, filed on Dec. 31, 2020. The entire contents of each of the above-referenced applications are expressly incorporated herein by reference.

TECHNICAL FIELD

This application relates to the technical field of electronic products, and in particular, to a charger.

BACKGROUND

With the development of fast charging technology, series charging technology of a plurality of batteries and half-voltage charging technology have gradually developed into the main direction of current charging technology. For example, the charging detection voltage for mobile phones and other electronic devices is 5V, which requires that the charger should also have a default output voltage of 5V. However, the fast charging technology requires the charger to have an extremely high output voltage, such as 10V or 20V, and may even reach 30V or 40V. While the current charger cannot reach a relatively wide voltage output range. If the output voltage range is relatively wide, the charging efficiency may be reduced; if the charging efficiency is relatively high, the output voltage range may be relatively low; and the current charger cannot guarantee both the wider voltage output range and the higher charging efficiency.

SUMMARY

Embodiments of this application provide a charger.

This application is implemented as follows.

According to a first aspect, an embodiment of this application provides a charger, including:

a power input end and a power output end; and a switching module and a transformer, where a primary side of the transformer is provided with a power input module, and the power input module is connected to the power input end through the switching module; and a secondary-side winding of the transformer is connected to the power output end, where the switching module can be switched among a first conducting state, a second conducting state, and a third conducting state; when an output voltage corresponding to the power output end is in the range of a first voltage V1 to a second voltage V2, the switching module is switched between the first conducting state and the second conducting state, and the power input module operates in a resonance mode; and when the output voltage corresponding to the power output end is in the range of a third voltage V3 to a fourth voltage V4, the switching module is in the third conducting state, and the power input module operates in a flyback mode, where V1 is greater than V3, and V2 is greater than V4.

In this way, in the foregoing solutions of this application, the power input module and the switching module are arranged on the primary side of the transformer, so that when the charger needs different output voltages, the switching module can be used to control the power input module to switch between the resonance mode and the flyback mode. When the output voltage is relatively high, the resonance mode can be used to achieve higher charging efficiency, and when the output voltage is relatively low, the flyback mode can be used to obtain a wider output voltage range, thus achieving both the wider voltage output range and higher charging efficiency.

DETAILED DESCRIPTION

Exemplary embodiments of this application will be described below in further detail with reference to the accompanying drawings. Although the exemplary embodiments of this application are shown in the accompanying drawings, it should be understood that this application may be implemented in various forms without being limited to the embodiments described herein. On the contrary, these embodiments are provided to enable a more thorough understanding of this application and to fully convey the scope of this application to those skilled in the art.

Figure 1:
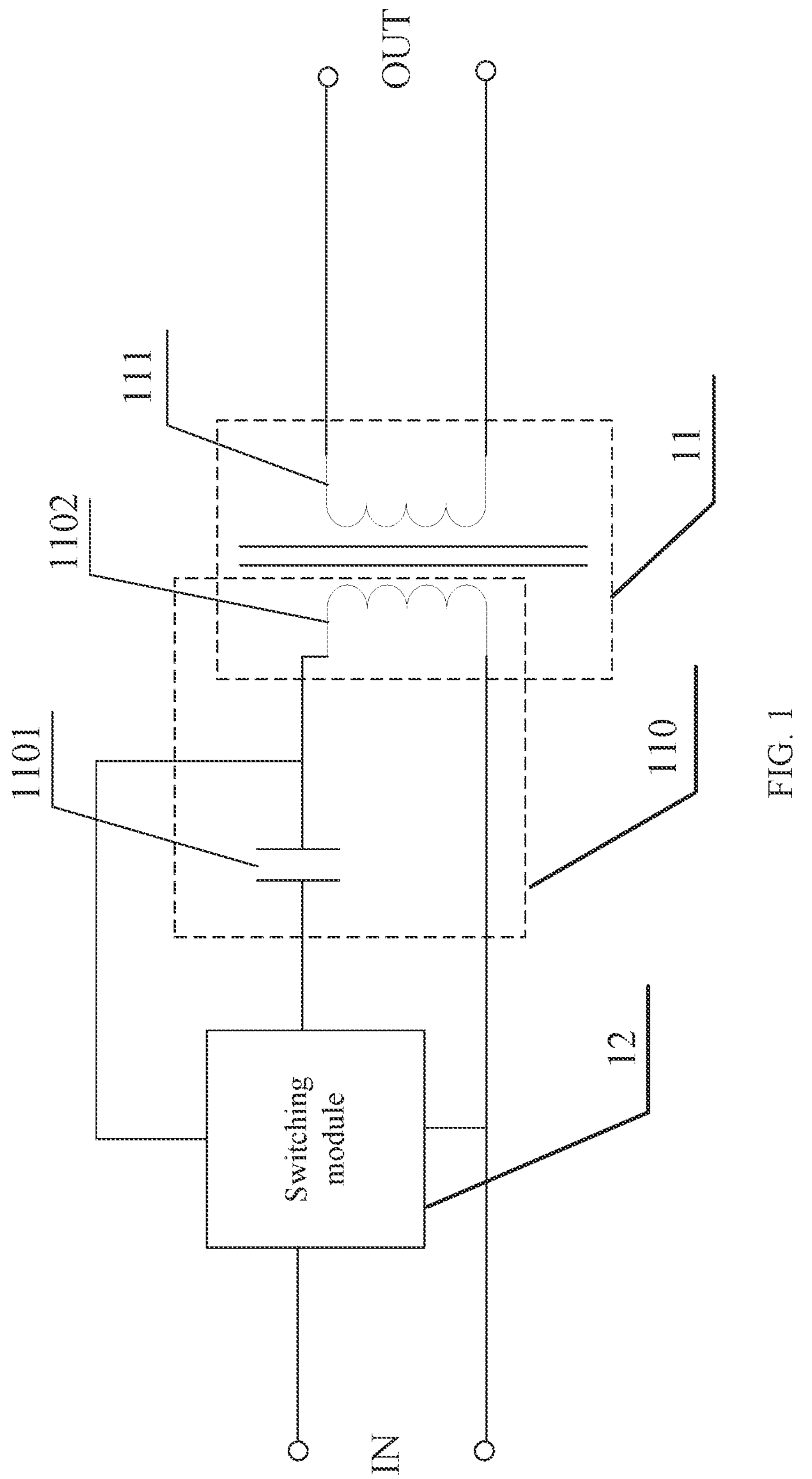
FIG. 1 is a first block diagram of a charger according to an embodiment of this application.

As shown in FIG. 1, an embodiment of this application provides a charger, including a power input end IN, a power output end OUT, a switching module 12, and a transformer 11.

A primary side of the transformer 11 is provided with a power input module 110, and the power input module 110 is connected to the power input end IN through the switching module 12; and a secondary-side winding 111 of the transformer 11 is connected to the power output end OUT.

The switching module 12 can be switched among a first conducting state, a second conducting state, and a third conducting state; when an output voltage corresponding to the power output end OUT is in the range of a first voltage V1 to a second voltage V2, the switching module 12 is switched between the first conducting state and the second conducting state, and the power input module 110 operates in a resonance mode; and when the output voltage corresponding to the power output end OUT is in the range of a third voltage V3 to a fourth voltage V4, the switching module 12 is in the third conducting state, and the power input module 110 operates in a flyback mode, where V1 is greater than V3, and V2 is greater than V4.

For example, a first voltage range is V1-V2, and a second voltage range is V3-V4. V1 is greater than V3, V2 is greater than V4, and V1 is less than V4, that is, a voltage hysteresis may be set between the first voltage range and the second voltage range to avoid frequent switching of switching modules. Or V1 is greater than V3, V2 is greater than V4, and V1 is greater than or equal to V4.

In this embodiment, the power input module 110 and the switching module 12 are arranged on the primary side of the transformer 11, so that when the charger needs different output voltages, the switching module 12 can be used to control the power input module 110 to switch between the resonance mode and the flyback mode.

When the output voltage is relatively high, the resonance mode can be used to achieve higher charging efficiency and reduce the loss; and when the output voltage is relatively low, the flyback mode has good characteristics of output voltage adjustment, and a wider output voltage range can be obtained, thus achieving both the wider voltage output range and higher charging efficiency. Moreover, through the separation of high voltage and low voltage, different topologies are used in different voltage segments to reduce the loss and reduce device stress.

In some embodiments, the power input end IN includes a first sub-end and a second sub-end; and the power input module 110 includes a first capacitor unit 1101 and a first primary-side winding 1102.

The first sub-end is separately connected to a first end of the first capacitor unit 1101 and a second end of the first capacitor unit 1101 through the switching module 12; the second sub-end is connected to the first end of the first capacitor unit 1101 through the switching module 12; and a first end of the first primary-side winding 1102 is connected to the second end of the first capacitor unit 1101, and a second end of the first primary-side winding 1102 is connected to the second sub-end.

When the switching module 12 is in the first conducting state, a current direction between the first sub-end and the second sub-end is: from the first sub-end via the first capacitor unit 1101, the first primary-side winding 1102 to the second sub-end; and when the switching module 12 is in the second conducting state, the current direction is: from the first capacitor unit 1101 via the second sub-end to the first sub-end.

In this way, when the switching module 12 is in the first conducting state, the first capacitor unit 1101 is in a charging state, and the energy on the first primary-side winding 1102 can be coupled to the secondary-side winding 111 of the transformer 11 and can be output; and when the switching module 12 is in the second conducting state, the first capacitor unit 1101 is in a discharging state, that is, the energy released by the first capacitor unit 1101 can flow back to the first sub-end through the switching module 12 via the second sub-end. In this solution, the switching module 12 is switched between the first conducting state and the second conducting state, that is, the power input module 110 is in the resonance mode, and a corresponding charging circuit forms a resonant topology, so that the loss can be reduced and the charging efficiency can be improved. In other words, this resonance mode can be understood as a mode in which both the first capacitor unit 1101 and the first primary-side winding 1102 are connected to the circuit (or it is referred to that both the first capacitor unit 1101 and the first primary-side winding 1102 are in an operating state).

When the switching module 12 is in the third conducting state, the current direction is: from the first sub-end via the first primary-side winding 1102 to the second sub-end.

In this way, when the switching module 12 is in the third conducting state, the first capacitor unit 1101 is not connected to the circuit, and the energy on the first primary-side winding 1102 can be coupled to the secondary-side winding 111 of the transformer 11 and can be output, that is, the power input module 110 is in the flyback mode, and a corresponding charging circuit forms a flyback topology, which has good characteristics of output voltage adjustment, thus obtaining wider voltage output. In other words, this flyback mode can be understood as a mode of the first primary-side winding 1102 (or it is referred to that the first primary-side winding 1102 is in an operating state).

For example, as an implementation, the switching module 12 may have a first connection end, a second connection end, a third connection end, and a fourth connection end; and the first connection end is connected to the first sub-end, the second connection end is connected to the second sub-end, the third connection end is connected to the first end of the first primary-side winding 1102 through the first capacitor unit 1101, the fourth connection end is connected to the first end of the first primary-side winding 1102, and the second end of the first primary-side winding 1102 is connected to the second sub-end.

When the switching module 12 is in the first conducting state, the first connection end is conducted with the third connection end; when the switching module 12 is in the second conducting state, the second connection end is conducted with the third connection end; and when the switching module 12 is in the third conducting state, the first connection end is conducted with the fourth connection end.

In some embodiments, the switching module 12 may use an integrated switch element to switch among the first conducting state, the second conducting state, and the third conducting state by controlling different conducting states of the switch element.

Figure 2:
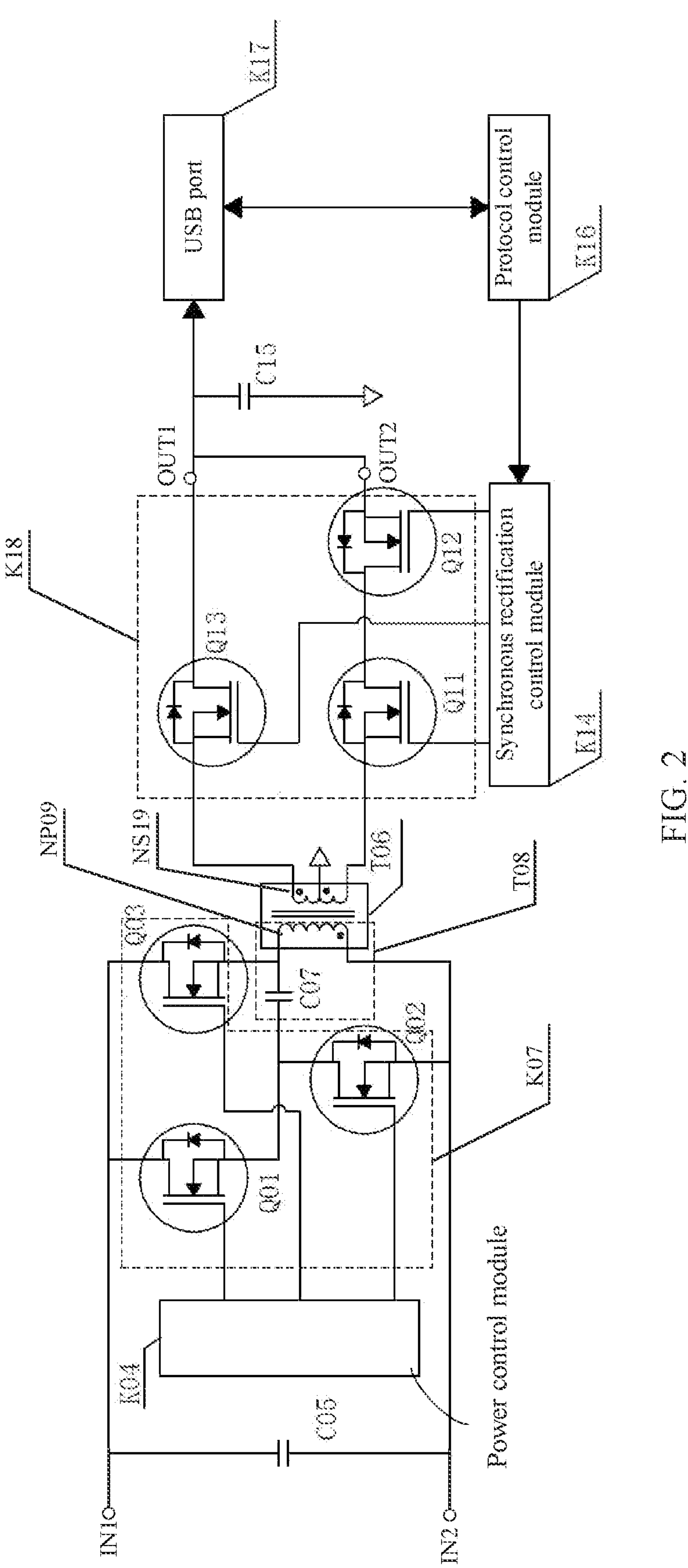
FIG. 2 is a schematic structural diagram of a circuit of a charger according to an embodiment of this application.

For example, as another implementation, as shown in FIG. 2, the switching module K07 includes a first switch unit Q01, a second switch unit Q02, and a third switch unit Q03.

A first end of the first switch unit Q01 is connected to the first sub-end IN1, a second end of the first switch unit Q01 is separately connected to the first end of the second switch unit Q02 and the first end of the first capacitor unit C07, the second end of the second switch unit Q02 is connected to the second sub-end IN2, a first end of the third switch unit Q03 is connected to the first sub-end IN1, and a second end of the third switch unit Q03 is connected to the second end of the first capacitor unit C07.

When the switching module K07 is in the first conducting state, the first switch unit Q01 is in a conducting state, and the second switch unit Q02 and the third switch unit Q03 are in a disconnected state; when the switching module K07 is in the second conducting state, the first switch unit Q01 and the third switch unit Q03 are in the disconnected state, and the second switch unit Q02 is in the conducting state: and when the switching module K07 is in the third conducting state, the first switch unit Q01 and the second switch unit Q02 are in the disconnected state, and the third switch unit Q03 is in the conducting state.

In some embodiments, the first switch unit Q01, the second switch unit Q02, and the third switch unit Q03 are all switch transistors.

In this embodiment, the switching module K07 includes combinations of a plurality of switch units, and the switching module K07 can be switched among the first conducting state, the second conducting state, and the third conducting state through combined switch states of the plurality of switch units, which can reduce the device selection cost.

For example, the first capacitor unit may be a capacitor element or a plurality of capacitor elements or an element/component with capacitive characteristics, or the like, which forms a resonance unit with the first primary-side winding, and the embodiments of this application are not limited thereto.

In some embodiments, the secondary-side winding NS19 includes a first end, a second end, and a third end; and the power output end OUT includes a third sub-end OUT1 and a fourth sub-end OUT2.

The charger further includes a switch module K18, where a first end of the secondary-side winding NS19 is connected to the third sub-end OUT1 through the switch module K18, a second end of the secondary-side winding NS19 is connected to the fourth sub-end OUT2 through the switch module K18, and a third end of the secondary-side winding NS19 is grounded.

The switch module K18 can be switched between a fourth conducting state and a fifth conducting state; and when the output voltage corresponding to the power output end is in the range of V1 to V2, the switch module K18 is in the fourth conducting state, the first end of the secondary-side winding NS19 is conducted with the third sub-end OUT1, and the second end of the secondary-side winding NS19 is conducted with the fourth sub-end OUT2, that is, when the power input module T08 is in the resonance mode, a resonant topology is formed with the switch module K18.

When the output voltage corresponding to the power output end is in the range of V3 to V4, the switch module K18 is in the fifth conducting state, the first end of the secondary-side winding NS19 is conducted with the third sub-end OUT1, that is, when the power input module T08 is in the flyback mode, a flyback topology is formed with the switch module K18.

In some embodiments, the switch module K18 includes a fourth switch unit Q13, a fifth switch unit Q11, and a sixth switch unit Q12.

The first end of the secondary-side winding NS19 is connected to the third sub-end OUT1 through the fourth switch unit Q13; and the second end of the secondary-side winding NS19 is connected to the fourth sub-end OUT2 through the fifth switch unit Q11 and the sixth switch unit Q12.

When the switch module K18 is in the fourth conducting state, the fourth switch unit Q13, the fifth switch unit Q11, and the sixth switch unit Q12 are all in the conducting state; and when the switch module K18 is in the fifth conducting state, the fourth switch unit Q13 is in the conducting state, and the fifth switch unit Q11 and the sixth switch unit Q12 are in the disconnected state.

In some embodiments, the charger may further include a synchronous rectification control module K14, where the synchronous rectification control module K14 is connected to the switch module K18 and is used to control the switch module K18 to switch between the fourth conducting state and the fifth conducting state. That is, the synchronous rectification control module K14 is separately connected to the fourth switch unit Q13, the fifth switch unit Q11, and the sixth switch unit Q12, and is used to control switch states (such as a conducting state or a disconnected state) of the fourth switch unit Q13, the fifth switch unit Q1*l*, and the sixth switch unit Q12.

In some embodiments, the charger may further include a power control module K04, where the power control module K04 is connected to the switching module K07.

The power control module K04 is configured to control the switching module K07 to be switched among the first conducting state, the second conducting state, and the third conducting state.

In some embodiments, the charger may further include a first charging interface (such as a USB port K17 in FIG. 2) and a protocol control module K16.

The first charging interface is connected to the power output end OUT; and the protocol control module K16 is separately connected to the first charging interface and the power control module K04.

In a case that the first charging interface is connected to a second charging interface of electrical equipment, the protocol control module K16 may perform protocol communication with the electrical equipment, so that the charger adjusts the output voltage/current. For example, the protocol control module K16 obtains a voltage that is required to be output by the power output end and that is fed back by the electrical equipment, and feeds back the voltage that is required to be output by the power output end and that is fed back by the electrical equipment to the power control module K04; and the power control module K04 controls, based on the voltage that is required to be output by the power output end and that is fed back by the electrical equipment, the switching module K07 to be switched among the first conducting state, the second conducting state, and the third conducting state.

The output voltage range of the charger described below is: V1-V3. For example, V1=5V, V3=20V, and V2=14V is preset as a transformation threshold voltage for explanation.

When the charger is turned on (or powered on), by default, Q01, Q02, Q11, and Q12 are controlled to be in the disconnected state. Q03 and Q13 are in the conducting state. In this case, junction capacitances of C07, Q01, and Q02 form a filter capacitor, and a capacitance of this filter capacitor is smaller than that of junction capacitances of Q01 and Q02, so as to absorb interference. Q03, the transformer T06, and Q13 form a flyback topology. The power control module K04 and the synchronous rectification control module K14 control switch transistors Q03 and Q13 to operate in a conducting state, so that the charger outputs a default voltage (such as 5V).

When the charger is connected to the electrical equipment (such as a mobile phone terminal), the protocol control module K16 communicates with the electrical equipment.

When the voltage required by the electrical equipment is relatively low (for example, 5-14V), the charger keeps operating at the flyback topology, so as to satisfy device stress requirements at a wide and low voltage. In this case, because the output power is relatively small (the output power P=the output voltage VO multiplied by the output current IO; when VO is relatively high, such as VO=V3, PO=P3=V3 multiplied by IO, and PO is relatively large; and when VO is relatively low, such as VO=V1, PO=P1=V1 multiplied by IO, and PO is relatively small), even if the efficiency is slightly lower, the loss of the charger is very small, and the heat generated is less.

When the voltage required by the electrical equipment is relatively high (for example, 14-20V), the charger controls Q01, Q02, Q11, and Q13 to be in a conducting state, Q03 to be in a disconnected state, and Q12 to be in a conducting state. In this case, Q01, Q02, C07, Q11, and Q13 form a resonant half-bridge LLC topology. By using the half-bridge characteristics (zero voltage on/off, small device stress), there is basically no switch loss on the switch transistor, which has very high efficiency and reduces loss. In this way, even if the current is relatively large, the output voltage is relatively high, and the output PO is relatively large, in the case of high efficiency, the loss is reduced, the charging loss is reduced, and the heat generated is less.

In this embodiment, by setting the switching module and the power input module, the charger has two topologies, which can have good efficiency at high power, and the charger can have a wide output voltage range (for example, 3-30V), which meets the power demand of mobile phones and other electrical equipment, and is compatible with the power demand of computers.

Figure 3:
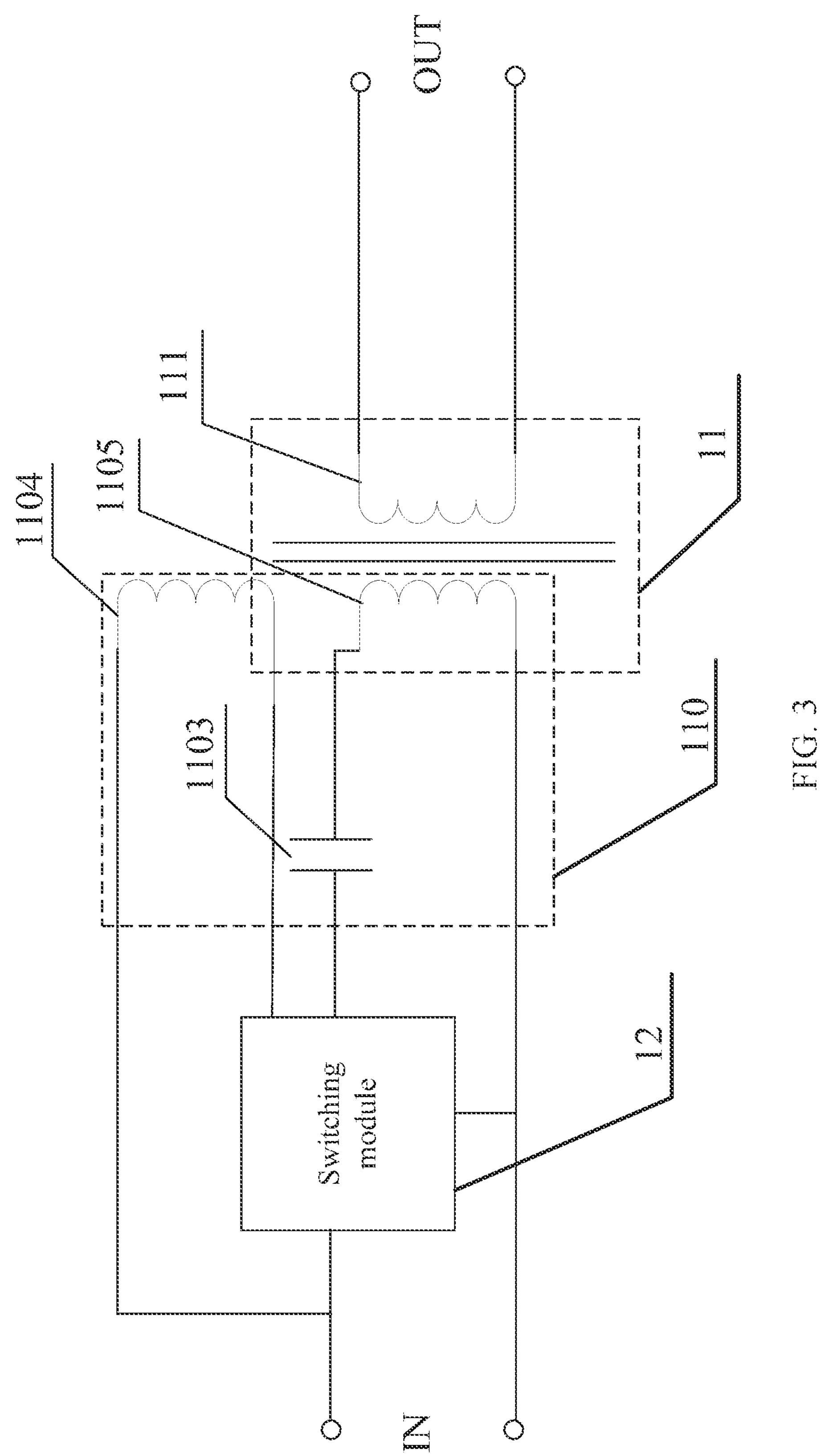
FIG. 3 is a second block diagram of a charger according to an embodiment of this application.

For example, as shown in FIG. 3, the power input end IN includes a first sub-end and a second sub-end; and the power input module 110 includes a second capacitor unit 1103, a second primary-side winding 1104, and a third primary-side winding 1105.

The first sub-end is connected to a first end of the second primary-side winding 1104 and is connected to a first end of the second capacitor unit 1103 through the switching module 12; the second sub-end is connected to a first end of the third primary-side winding 1105, and is separately connected to a first end of the second capacitor unit 1103 and a second end of the second primary-side winding 1104 through the switching module 12; and a second end of the third primary-side winding 1105 is connected to a second end of the second capacitor unit 1103.

When the switching module 12 is in the first conducting state, a current direction between the first sub-end and the second sub-end is: from the first sub-end via the second capacitor unit 1103, the third primary-side winding 1105 to the second sub-end; and when the switching module 12 is in the second conducting state, the current direction is: from the second capacitor unit 1103 via the second sub-end to the first sub-end.

In this way, when the switching module 12 is in the first conducting state, the second capacitor unit 1103 is in a charging state, and the energy on the third primary-side winding 1105 can be coupled to the secondary-side winding 111 of the transformer 11 and can be output; and when the switching module 12 is in the second conducting state, the second capacitor unit 1103 is in a discharging state, that is, the energy released by the second capacitor unit 1103 can flow back to the first sub-end through the second sub-end. In this solution, the switching module 12 is switched between the first conducting state and the second conducting state, that is, the power input module is in the resonance mode, and a corresponding charging circuit forms a resonant topology, so that the loss can be reduced and the charging efficiency can be improved. In other words, this resonance mode can be understood as a mode in which both the second capacitor unit 1103 and the third primary-side winding 1105 are connected to the circuit (or it is referred to that both the second capacitor unit 1103 and the third primary-side winding 1105 are in an operating state).

When the switching module 12 is in the third conducting state, the current direction is: from the first sub-end via the second primary-side winding 1104 to the second sub-end.

In this way, when the switching module 12 is in the third conducting state, the second capacitor unit 1103 and the third primary-side winding 1105 are not connected to the circuit, and the energy on the second primary-side winding 1104 can be coupled to the secondary-side winding 111 of the transformer 11 and can be output, that is, the power input module is in the flyback mode, and a corresponding charging circuit forms a flyback topology, which has good characteristics of output voltage adjustment, thus obtaining wider voltage output. In other words, this flyback mode can be understood as a mode of the second primary-side winding 1104 (or it is referred to that the second primary-side winding 1104 is in an operating state).

For example, as an implementation, the switching module 12 has a first connection end, a second connection end, a third connection end, and a fourth connection end; and the first connection end is connected to the first sub-end, the second connection end is connected to the second sub-end, the third connection end is connected to the first end of the second capacitor unit 1103, and the fourth connection end is connected to the second end of the second primary-side winding 1104.

When the switching module 12 is in the first conducting state, the first connection end is conducted with the third connection end; when the switching module 12 is in the second conducting state, the second connection end is conducted with the third connection end; and when the switching module 12 is in the third conducting state, the second connection end is conducted with the fourth connection end.

In some embodiments, the switching module 12 may use an integrated switch element to switch among the first conducting state, the second conducting state, and the third conducting state by controlling different conducting states of the switch element.

Figure 4:
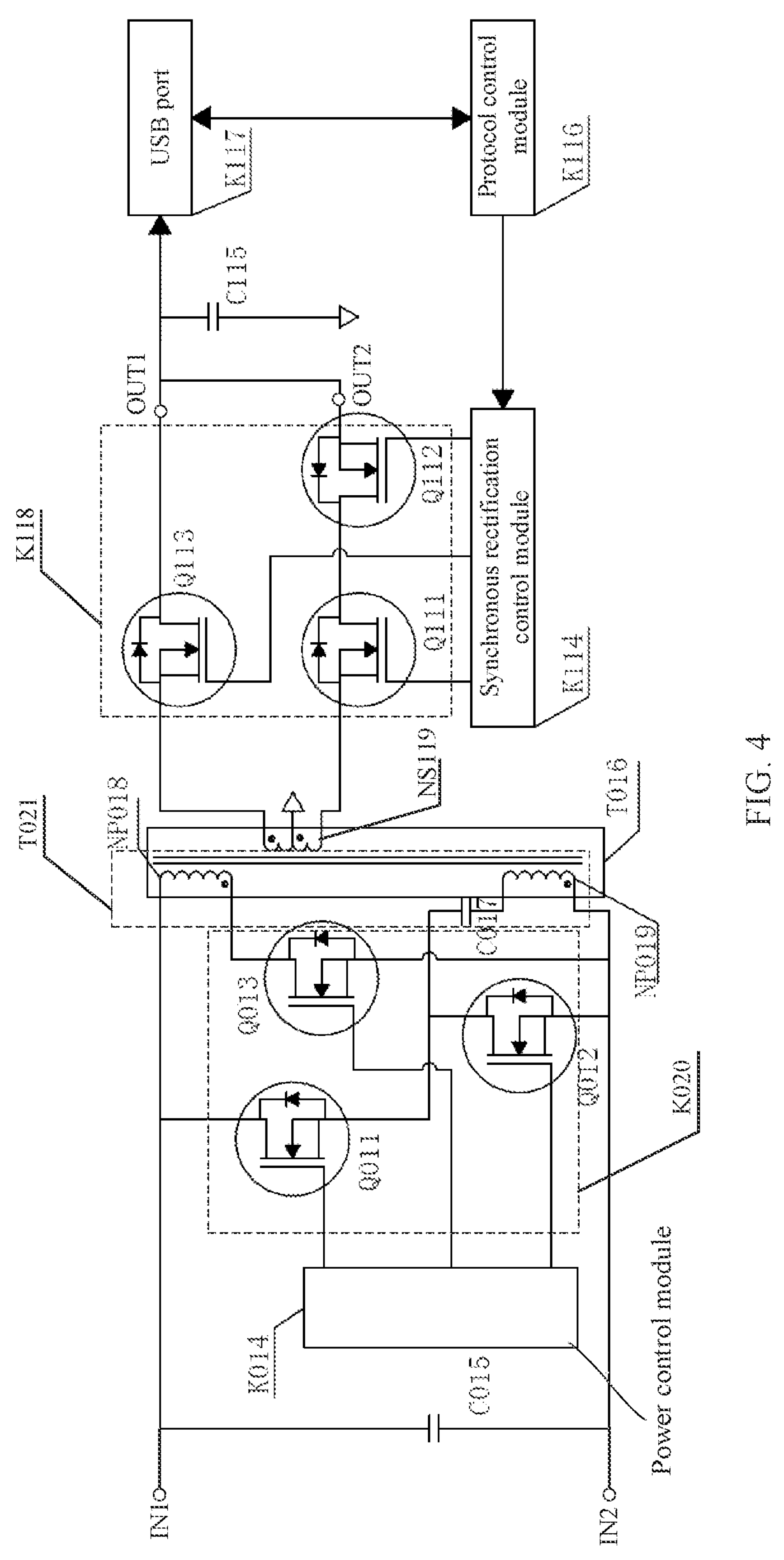
FIG. 4 is a second schematic structural diagram of a circuit of a charger according to an embodiment of this application.

For example, as another implementation, as shown in FIG. 4, the switching module K020 includes a first switch unit Q011, a second switch unit Q012, and a third switch unit Q013.

A first end of the first switch unit Q011 is connected to the first sub-end IN1, a second end of the first switch unit Q011 is separately connected to the first end of the second switch unit Q012 and the first end of the second capacitor unit C017, the second end of the second switch unit Q012 is connected to the second sub-end IN2, a first end of the third switch unit Q013 is connected to the second sub-end IN2, and a second end of the third switch unit Q013 is connected to the second end of the second primary-side winding NP018.

When the switching module K020 is in the first conducting state, the first switch unit Q011 is in a conducting state, and the second switch unit Q012 and the third switch unit Q013 are in a disconnected state; when the switching module K020 is in the second conducting state, the first switch unit Q011 and the third switch unit Q013 are in the disconnected state, and the second switch unit Q012 is in the conducting state; and when the switching module K020 is in the third conducting state, the first switch unit Q011 and the second switch unit Q012 are in the disconnected state, and the third switch unit Q013 is in the conducting state.

In some embodiments, the first switch unit Q011, the second switch unit Q012, and the third switch unit Q013 are all switch transistors.

In this embodiment, the switching module K020 includes combinations of a plurality of switch units, and the switching module K020 can be switched among the first conducting state, the second conducting state, and the third conducting state through combined switch states of the plurality of switch units, which can reduce the device selection cost.

For example, the first capacitor unit may be a capacitor element or a plurality of capacitor elements or an element/component with capacitive characteristics, or the like, which forms a resonance unit with the first primary-side winding, and the embodiments of this application are not limited thereto.

In some embodiments, the secondary-side winding NS119 includes a first end, a second end, and a third end; and the power output end OUT includes a third sub-end OUT1 and a fourth sub-end OUT2.

The charger further includes a switch module K118, where a first end of the secondary-side winding NS119 is connected to the third sub-end OUT1 through the switch module K118, a second end of the secondary-side winding NS119 is connected to the fourth sub-end OUT2 through the switch module K118, and a third end of the secondary-side winding NS119 is grounded.

The switch module K118 can be switched between a fourth conducting state and a fifth conducting state; and when the output voltage corresponding to the power output end is in the range of V1 to V2, the switch module K118 is in the fourth conducting state, the first end of the secondary-side winding NS119 is conducted with the third sub-end, and the second end of the secondary-side winding NS119 is conducted with the fourth sub-end, that is, when the power input module T021 is in the resonance mode, a resonant topology is formed with the switch module K118.

When the output voltage corresponding to the power output end is in the range of V3 to V4, the switch module K118 is in the fifth conducting state, the first end of the secondary-side winding NS119 is conducted with the third sub-end, that is, when the power input module T021 is in the flyback mode, a flyback topology is formed with the switch module K118.

In some embodiments, the switch module K118 includes a fourth switch unit Q113, a fifth switch unit Q111, and a sixth switch unit Q112.

The first end of the secondary-side winding NS119 is connected to the third sub-end OUT1 through the fourth switch unit Q113; and the second end of the secondary-side winding NS119 is connected to the fourth sub-end OUT2 through the fifth switch unit Q111 and the sixth switch unit Q112.

When the switch module K118 is in the fourth conducting state, the fourth switch unit Q113, the fifth switch unit Q111, and the sixth switch unit Q112 are all in the conducting state; and when the switch module K118 is in the fifth conducting state, the fourth switch unit Q113 is in the conducting state, and the fifth switch unit Q111 and the sixth switch unit Q112 are in the disconnected state.

In some embodiments, the charger may further include a synchronous rectification control module K114, where the synchronous rectification control module K114 is connected to the switch module K118 and is used to control the switch module K118 to switch between the fourth conducting state and the fifth conducting state. That is, the synchronous rectification control module K114 is separately connected to the fourth switch unit Q113, the fifth switch unit Q111, and the sixth switch unit Q112, and is used to control switch states (such as a conducting state or a disconnected state) of the fourth switch unit Q113, the fifth switch unit Q111, and the sixth switch unit Q112.

In some embodiments, the charger may further include a power control module K014, where the power control module K014 is connected to the switching module K020.

The power control module K014 is configured to control the switching module K020 to be switched among the first conducting state, the second conducting state, and the third conducting state.

In some embodiments, the charger may further include a first charging interface (such as a USB port K117 in FIG. 4) and a protocol control module K116.

The first charging interface is connected to the power output end OUT; and the protocol control module K116 is separately connected to the first charging interface and the power control module K014.

In a case that the first charging interface is connected to a second charging interface of electrical equipment, the protocol control module K116 may perform protocol communication with the electrical equipment, so that the charger adjusts the output voltage/current. For example, the protocol control module K116 obtains a voltage that is required to be output by the power output end and that is fed back by the electrical equipment, and feeds back the voltage that is required to be output by the power output end and that is fed back by the electrical equipment to the power control module K014; and the power control module K014 controls, based on the voltage that is required to be output by the power output end and that is fed back by the electrical equipment, the switching module K020 to be switched among the first conducting state, the second conducting state, and the third conducting state.

The output voltage range of the charger described below is: V1-V3. For example, V1=5V, V3=20V, and V2=14V is preset as a transformation threshold voltage for explanation.

When the charger is turned on (or powered on), by default, Q011, Q012, Q111, and Q112 are controlled to be in the disconnected state, and Q013 and Q113 are in the conducting state. In this case, C017 has one foot to be suspended and loses its function. One winding NP019 (resonant winding) of the transformer T016 is grounded at one end, which can form a shielding winding, and has a good suppression effect on ElectroMagnetic Compatibility (EMC). Q013, the transformer T016, and Q113 form a flyback topology, which is more conducive to wide voltage output and power supply stress requirements. The power control module K014 and the synchronous rectification control module K114 control switch transistors Q013 and Q113 to operate in a conducting state, so that the charger outputs a default voltage (such as 5V).

When the charger is connected to the electrical equipment (such as a mobile phone terminal), the protocol control module K116 communicates with the electrical equipment.

When the voltage required by the electrical equipment is relatively low (for example, 5-14V), the charger keeps operating at the flyback topology, so as to satisfy device stress requirements at a wide and low voltage. In this case, because the output power is small, even if the efficiency is slightly lower, the loss of the charger is very small and the heat generated is not much.

When the voltage required by the electrical equipment is relatively high (for example, 14-20V), the charger controls Q011, Q012, Q111, and Q113 to be in a conducting state, Q013 to be in a disconnected state, and Q112 to be in a conducting state. In this case, Q011, Q012, C017, Q111, and Q113 form a resonant half-bridge LLC topology, which is characterized by high efficiency. Even if the current is relatively large, the output voltage is relatively high, and the output PO is relatively large, the loss is reduced in the case of high efficiency. The charging loss becomes smaller and the heat generated is less. Moreover, there is one winding NP018 of the transformer T016, where one end of the winding is connected to a high voltage terminal, and the other end of the winding becomes an open circuit performed by the switch transistor Q013. This can form a shielding winding and can have a good EMC shielding effect.

In this embodiment, by setting the switching module and the power input module, the charger has two topologies, which can have good efficiency at high power, and the charger can have a wide output voltage range (for example, 3-30V), which meets the power demand of mobile phones and other electrical equipment, and is compatible with the power demand of computers. In addition, the design of the transformer is simpler, and can have a good shielding effect.

The embodiments in this specification are described in a progressive manner. Each embodiment focuses on a difference from another embodiment. For a same or similar part of the embodiments, refer to each other.

Although some embodiments of this application have been described, those skilled in the art may make additional changes and modifications to these embodiments once they learn the basic inventive concept. Therefore, the appended claims are intended to be interpreted as including the embodiments and all changes and modifications that fall within the scope of the embodiments of this application.

Finally, it should be further noted that, in this specification, relationship terms such as first and second are only used to distinguish an entity or operation from another entity or operation, but do not necessarily require or imply that there is any actual relationship or order between these entities or operations. Moreover, the term "include", "comprise", or any other variant is intended to cover a non-exclusive inclusion, so that a process, a method, an article, or a terminal device that includes a list of elements not only includes those elements but also includes other elements that are not explicitly listed, or further includes elements inherent to such a process, method, article, or terminal device. Without more restrictions, the elements defined by the sentence "including a . . . " do not exclude the existence of other identical elements in the process, method, article, or terminal device including the elements.

It should be noted that, within the technical concept of this application, those ordinarily skilled in the art can make various improvements and modifications, which shall all fall within the protective scope of this application.

The invention claimed is:

1. A charger, comprising:

a power input end;

a power output end;

a switching module; and a transformer, wherein:

a primary side of the transformer is provided with a power input module, the power input module is connected to the power input end through the switching module, and a secondary-side winding of the transformer is connected to the power output end, wherein:

the switching module can be switched among a first conducting state, a second conducting state, and a third conducting state;

when an output voltage corresponding to the power output end is in the range of a first voltage V1 to a second voltage V2, the switching module is switched between the first conducting state and the second conducting state, and the power input module operates in a resonance mode; and when the output voltage corresponding to the power output end is in the range of a third voltage V3 to a fourth voltage V4, the switching module is in the third conducting state, and the power input module operates in a flyback mode, wherein V1 is greater than V3, and V2 is greater than V4.

2. The charger according to claim 1, wherein the power input end comprises a first sub-end and a second sub-end; and the power input module comprises a first capacitor unit and a first primary-side winding, wherein:

the first sub-end is separately connected to a first end of the first capacitor unit and a second end of the first capacitor unit through the switching module;

the second sub-end is connected to the first end of the first capacitor unit through the switching module;

a first end of the first primary-side winding is connected to the second end of the first capacitor unit, and a second end of the first primary-side winding is connected to the second sub-end, wherein:

when the switching module is in the first conducting state, a current direction between the first sub-end and the second sub-end is: from the first sub-end via the first capacitor unit, the first primary-side winding to the second sub-end;

when the switching module is in the second conducting state, the current direction is: from the first capacitor unit via the second sub-end to the first sub-end; and when the switching module is in the third conducting state, the current direction is: from the first sub-end via the first primary-side winding to the second sub-end.

3. The charger according to claim 2, wherein the switching module comprises a first switch unit, a second switch unit, and a third switch unit, wherein:

a first end of the first switch unit is connected to the first sub-end, a second end of the first switch unit is separately connected to the first end of the second switch unit and the first end of the first capacitor unit, the second end of the second switch unit is connected to the second sub-end, a first end of the third switch unit is connected to the first sub-end, and a second end of the third switch unit is connected to the second end of the first capacitor unit, wherein:

when the switching module is in the first conducting state, the first switch unit is in a conducting state, and the second switch unit and the third switch unit are in a disconnected state;

when the switching module is in the second conducting state, the first switch unit and the third switch unit are in the disconnected state, and the second switch unit is in the conducting state; and when the switching module is in the third conducting state, the first switch unit and the second switch unit are in the disconnected state, and the third switch unit is in the conducting state.

4. The charger according to claim 1, wherein the power input end comprises a first sub-end and a second sub-end, and the power input module comprises a second capacitor unit, a second primary-side winding, and a third primary-side winding, wherein:

the first sub-end is connected to a first end of the second primary-side winding and is connected to a first end of the second capacitor unit through the switching module;

the second sub-end is connected to a first end of the third primary-side winding, and is separately connected to a first end of the second capacitor unit and a second end of the second primary-side winding through the switching module; and a second end of the third primary-side winding is connected to a second end of the second capacitor unit, wherein:

when the switching module is in the first conducting state, a current direction between the first sub-end and the second sub-end is: from the first sub-end via the second capacitor unit, the third primary-side winding to the second sub-end;

when the switching module is in the second conducting state, the current direction is: from the second capacitor unit via the second sub-end to the first sub-end; and when the switching module is in the third conducting state, the current direction is: from the first sub-end via the second primary-side winding to the second sub-end.

5. The charger according to claim 4, wherein the switching module comprises a first switch unit, a second switch unit, and a third switch unit, wherein:

a first end of the first switch unit is connected to the first sub-end, a second end of the first switch unit is separately connected to a first end of the second switch unit and the first end of the second capacitor unit, the second end of the second switch unit is connected to the second sub-end, a first end of the third switch unit is connected to the second sub-end, and a second end of the third switch unit is connected to a second end of the second primary-side winding, wherein:

when the switching module is in the first conducting state, the first switch unit is in a conducting state, and the second switch unit and the third switch unit are in a disconnected state;

when the switching module is in the second conducting state, the first switch unit and the third switch unit are in the disconnected state, and the second switch unit is in the conducting state; and when the switching module is in the third conducting state, the first switch unit and the second switch unit are in the disconnected state, and the third switch unit is in the conducting state.

6. The charger according to claim 3, wherein the first switch unit, the second switch unit, and the third switch unit are all switch transistors.

7. The charger according to claim 5, wherein the first switch unit, the second switch unit, and the third switch unit are all switch transistors.

8. The charger according to claim 1, wherein:

the secondary-side winding comprises a first end, a second end, and a third end, the power output end comprises a third sub-end and a fourth sub-end, and the charger further comprises a switch module, wherein a first end of the secondary-side winding is connected to the third sub-end through the switch module, a second end of the secondary-side winding is connected to the fourth sub-end through the switch module, and a third end of the secondary-side winding is grounded, wherein:

the switch module can be switched between a fourth conducting state and a fifth conducting state;

when the output voltage corresponding to the power output end is in the range of V1 to V2, the switch module is in the fourth conducting state, the first end of the secondary-side winding is conducted with the third sub-end, and the second end of the secondary-side winding is conducted with the fourth sub-end; and when the output voltage corresponding to the power output end is in the range of V3 to V4, the switch module is in the fifth conducting state, and the first end of the secondary-side winding is conducted with the third sub-end.

9. The charger according to claim 8, wherein the switch module comprises a fourth switch unit, a fifth switch unit, and a sixth switch unit, wherein:

the first end of the secondary-side winding is connected to the third sub-end through the fourth switch unit; and the second end of the secondary-side winding is connected to the fourth sub-end through the fifth switch unit and the sixth switch unit, wherein:

when the switch module is in the fourth conducting state, the fourth switch unit, the fifth switch unit, and the sixth switch unit are all in a conducting state; and when the switch module is in the fifth conducting state, the fourth switch unit is in the conducting state, and the fifth switch unit and the sixth switch unit are in a disconnected state.

10. The charger according to claim 1, further comprising:

a power control module connected to the switching module, wherein:

the power control module is configured to control the switching module to be switched among the first conducting state, the second conducting state, and the third conducting state.

11. The charger according to claim 10, further comprising:

a first charging interface connected to the power output end; and a protocol control module separately connected to the first charging interface and the power control module, wherein:

when the first charging interface is connected to a second charging interface of electrical equipment, the protocol control module obtains a voltage that is required to be output by the power output end and that is fed back by the electrical equipment, and feeds back the voltage that is required to be output by the power output end and that is fed back by the electrical equipment to the power control module; and the power control module controls, based on the voltage that is required to be output by the power output end and that is fed back by the electrical equipment, the switching module to be switched among the first conducting state, the second conducting state, and the third conducting state.

* * * * *